US010176657B2

(12) United States Patent
Burg et al.

(10) Patent No.: US 10,176,657 B2
(45) Date of Patent: *Jan. 8, 2019

(54) TECHNIQUES FOR TELEPHONY-BASED VOTING

(71) Applicant: AT&T Intellectual Property II, L.P., Atlanta, GA (US)

(72) Inventors: Fred Burg, West Long Branch, NJ (US); John Kantonides, Colts Neck, NJ (US); Larry Russell, Atlantic Highlands, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 741 days.

This patent is subject to a terminal disclaimer.

(21) Appl. No.: 14/823,318

(22) Filed: Aug. 11, 2015

(65) Prior Publication Data

US 2015/0348348 A1   Dec. 3, 2015

Related U.S. Application Data

(63) Continuation of application No. 14/286,224, filed on May 23, 2014, now Pat. No. 9,142,073, which is a continuation of application No. 13/647,652, filed on Oct. 9, 2012, now Pat. No. 8,781,085, which is a continuation of application No. 12/381,515, filed on Mar. 12, 2009, now Pat. No. 8,320,537, which is a continuation of application No. 11/060,252, filed on Feb. 17, 2005, now Pat. No. 7,522,715.

(51) Int. Cl.
*H04M 11/00* (2006.01)
*G07C 13/00* (2006.01)
*H04M 3/22* (2006.01)
*H04M 3/42* (2006.01)

(52) U.S. Cl.
CPC .......... *G07C 13/00* (2013.01); *H04M 3/2218* (2013.01); *H04M 3/4228* (2013.01); *H04M 3/42348* (2013.01); *G06Q 2230/00* (2013.01); *H04M 3/42059* (2013.01); *H04M 2203/1041* (2013.01); *H04M 2207/12* (2013.01)

(58) Field of Classification Search
CPC ................ G07C 13/00; H04M 3/2218; H04M 3/42348; H04M 3/4228; H04M 2207/12; H04M 3/42059; H04M 2203/1041; G06Q 2230/00
USPC .............................. 379/92.01, 92.02; 705/12
See application file for complete search history.

(56) References Cited

U.S. PATENT DOCUMENTS

| | | | |
|---|---|---|---|
| 4,151,370 A | 4/1979 | Root | |
| 4,962,525 A * | 10/1990 | Beckh | G07C 13/00 379/139 |
| 5,479,492 A | 12/1995 | Hofstee | |
| 5,675,635 A | 10/1997 | Vos et al. | |

(Continued)

*Primary Examiner* — Stella L. Woo

(57) ABSTRACT

A telephone network voting system receives telephone ballots cast by voters by dialing a telephone number. The telephone number is dialed by voters spread over a large geographic area. The voting calls are routed to points of presence local to or otherwise identified with the caller by using the caller's ANI or other originating number identification. The points of presence then accumulate votes and periodically forward tallies to a centralized location over a data network. Instructions may be transmitted from the centralized location to the points of presence.

18 Claims, 2 Drawing Sheets

(56) References Cited

U.S. PATENT DOCUMENTS

| | | | |
|---|---|---|---|
| 5,832,064 A | 11/1998 | Jeong | |
| 5,838,774 A * | 11/1998 | Weisser, Jr. ........... | H04M 3/493 |
| | | | 379/92.02 |
| 6,016,337 A * | 1/2000 | Pykalisto ............. | H04Q 3/0029 |
| | | | 379/207.02 |
| 6,324,266 B1 | 11/2001 | Mannings | |
| 6,590,966 B2 | 7/2003 | Tittle | |
| 6,768,895 B2 | 7/2004 | Lahtinen | |
| 6,831,914 B1 | 12/2004 | Wheeler | |
| 7,336,774 B2 | 2/2008 | Creamer et al. | |
| 7,379,705 B1 | 5/2008 | Rados et al. | |
| 7,522,715 B1 * | 4/2009 | Burg ................... | H04M 3/4228 |
| | | | 379/92.02 |
| 8,320,537 B1 * | 11/2012 | Burg ................... | H04M 3/4228 |
| | | | 379/92.02 |
| 8,781,085 B2 * | 7/2014 | Burg ................... | H04M 3/4228 |
| | | | 379/92.02 |
| 9,142,073 B2 * | 9/2015 | Burg ................... | H04M 3/4228 |
| 2003/0100321 A1 | 5/2003 | Rao et al. | |
| 2004/0248552 A1 | 12/2004 | Mazurick et al. | |

* cited by examiner

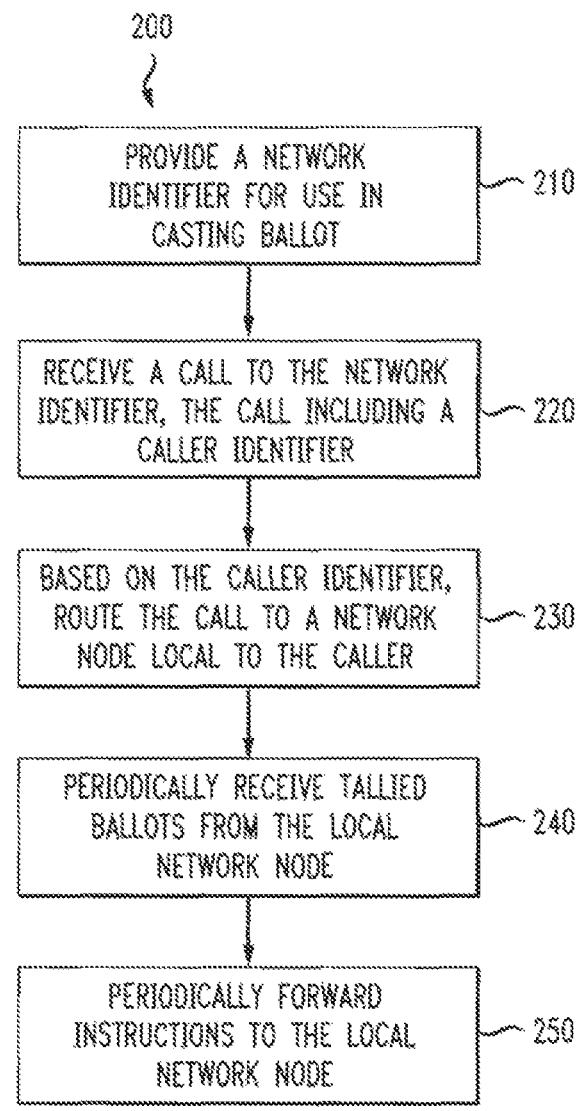

TECHNIQUES FOR TELEPHONY-BASED VOTING

CROSS REFERENCE TO RELATED APPLICATIONS

This application is a continuation of U.S. patent application Ser. No. 14/286,224, entitled "Improved Techniques For Telephony-Based Voting," filed on May 23, 2014, issued as U.S. Pat. No. 9,142,073 on Sep. 22, 2015, the disclosure of which is incorporated herein by reference in its entirety, which is a continuation of U.S. patent application Ser. No. 13/647,652, entitled "Improved Techniques For Telephony-Based Voting," filed on Oct. 9, 2012, issued as U.S. Pat. No. 8,781,085 on Jul. 15, 2014, the disclosure of which is incorporated herein by reference in its entirety, which is a continuation of U.S. patent application Ser. No. 12/381,515, entitled "Improved Techniques For Telephony-Based Voting," filed on Mar. 12, 2009, issued as U.S. Pat. No. 8,320,537 on Nov. 27, 2012, the disclosure of which is incorporated herein by reference in its entirety, which is a continuation of U.S. patent application Ser. No. 11/060,252, entitled "Techniques For Telephony-Based Voting," filed on Feb. 17, 2005, issued as U.S. Pat. No. 7,522,715 on Apr. 21, 2009, the disclosure of which is incorporated herein by reference in its entirety.

FIELD OF THE INVENTION

The present invention relates generally to a network-based vote-casting and tallying system and, more particularly, to a network balloting system capable of handling a large volume of voting calls spread over a large geographic area or network space.

BACKGROUND OF THE INVENTION

Electronic voting techniques are often used to collect public opinion from an audience during an event. For example, members of an audience may be asked to submit their individual opinions via a communications or computer network during a televised entertainment event or during a political event. The individual opinions may then be analyzed to determine the aggregate opinions of the audience.

Frequently, voting is triggered by a live, broadcast announcement. For example, a televised talent show may ask the audience to vote on a preferred performer, providing a toll-free (8YY) number for audience members to call to place a vote. Vast numbers of votes are therefore placed nearly simultaneously.

In a typical scenario, a media company interested in staging such a television viewer-based voting event contracts with a network provider to provide one or more 8YY numbers that audience members can call from their residential phones to place a vote. Current processes result in those calls being routed through a local company (e.g., an incumbent local exchange carrier (ILEC)) which then determines to which inter-exchange carrier (IXC) to send the call based on the dialed 8YY number. That results in access charges being paid by the contracting network provider to the ILEC for completing the call. Such a network configuration also focuses the calls on a centralized location, thereby potentially clogging up (part of) the network.

Systems have been proposed for overcoming the congestion problem triggered by a telephone voting event. For example, U.S. Pat. No. 6,768,895 discloses a mobile telephone voting system wherein a polling server authorizes only a predetermined percentage of incoming voting calls. The percentage is increased or decreased in subsequent rounds based on a statistical analysis of the previous results. In that way, the polling server may be scaled down and network congestion is reduced.

U.S. Pat. No. 6,324,266 discloses a local voting system for opinion-gathering in a conference center, an auditorium or the like. The system utilizes telephone handsets for use by the voters. Calling line identity is user to identify any ineligible callers.

U.S. Pat. No. 6,016,337 discusses televoting in an intelligent network. Voting calls are routed according to the dialed number to a service switching point, where the calls are processed. The calls are filtered by calling number to verify that the call is from an allowed area.

A telephone polling method is described in U.S. Pat. No. 5,838,774, in which an Advanced Intelligent Network (AIN) is utilized to process ballots. In that method, a local originating switch sends a request to the AIN for information on how to route the call (as is done for any other call even if not a "ballot" call). The AIN determines that the called number belongs to a subscriber to the ballot service, and makes a tally in a database of the number called. Several structures are described for collecting votes: the subscriber can have one number for each candidate, in which case a call to the number indicates a vote for the corresponding candidate. Alternatively, a single number may be used for all candidates, in which case a caller interaction program asks who the voter is voting for. In either case, the AIN can provide a caller termination announcement.

The '774 patent further describes moving the AIN-local switch interaction from the originating switch to the terminating switch, using a "terminating trigger." The AIN tabulates the votes in that case as well.

It is known in the telecommunications art to route a call based on call origination information. For example, in emergency systems such as the 911 system, a single number (911) is used over a large geographic area for local emergency services. An emergency 911 call is routed to an emergency center local to the caller based on the calling number.

Similarly, retail goods and services having a telephone contact number that is publicized or marketed nationally or regionally may use a service whereby a call to the nationally-marketed telephone number will be routed to a retail outlet nearest the caller. The routing is based on the Automatic Number Identification (ANI), wherein a caller's telephone number is contained in the call set-up messaging. The AIN accesses a database correlating caller telephone numbers with the closest retail outlets. The AIN looks up the calling number in the database and determines the telephone number of the closest retail location to the caller; it then returns that number to the originating local switch. That switch routes the call to the retail location closest to the caller.

In the above examples of network voting systems, it is the AIN that is tabulating the voting results. That situation creates a bottleneck in that all requests go to a single location. There remains a need for a telephonic voting system that may be used to record opinion during a national or widely-viewed event, while minimizing network congestion caused by the voting calls and reducing or eliminating network access charges to the long distance carrier.

SUMMARY OF THE INVENTION

The present invention addresses the needs described above by providing a method and system for receiving votes in a network. In one embodiment, a method is provided for receiving a ballot from a caller in a network-based voting system. The method includes receiving from the caller a ballot addressed to a prearranged network identifier, the ballot including a caller identifier, and, based on the caller identifier, routing the ballot to a network node local to the caller. Tallied ballots are periodically received from the local network node.

At least a portion of the network-based voting system may be a telephony-based system. The network identifier may be a telephone number. In that case the caller identifier may be a caller telephone number, which may be determined using ANI.

At least a portion of the network-based voting system may be an IP network. In that case, at least one of the network identifier and the caller identifier may be an IP address. At least one of the network identifier and the caller identifier may alternatively be a URL.

The method may further comprise the step of forwarding instructions to the local network node for processing a ballot. The instructions may include data representing a set of candidates.

The prearranged network identifier may identify a candidate for whom the caller is voting.

In another embodiment of the invention, a telephony-based voting system includes a database containing a mapping of voter telephone numbers to points of presence, a call router configured to route a telephone ballot containing a voter telephone number to a selected one of a plurality of points of presence based on the voter telephone number and the mapping of voter telephone numbers to points of presence, and a centralized site configured for periodically receiving telephone ballots from the points of presence.

The call router may further be configured to route calls directed to a single balloting telephone number, or to route telephone ballots directed to a plurality of balloting telephone numbers.

The centralized site may further be configured to transmit instructions to the points of presence. Those instructions may include voice data. The voice data may include a courtesy response.

The points of presence may include interactive voice response systems. Those interactive voice response systems may be configured to prompt and receive a ballot for a particular candidate.

Another embodiment of the invention is a network-based voting system that includes a plurality of nodes for receiving ballots from voters, a database containing a mapping of voter network identifiers to the nodes, a router configured to route a ballot to a selected one of the plurality of nodes based on an associated voter network identifier and the mapping of voter network identifiers to nodes, and a centralized site configured for periodically tallying the ballots from each of the nodes and for periodically transmitting instructions to the nodes for processing the ballots.

BRIEF DESCRIPTION OF THE DRAWINGS

FIG. 2 is a block diagram showing a method according to one embodiment of the invention.

DESCRIPTION OF THE INVENTION

Figure 1:
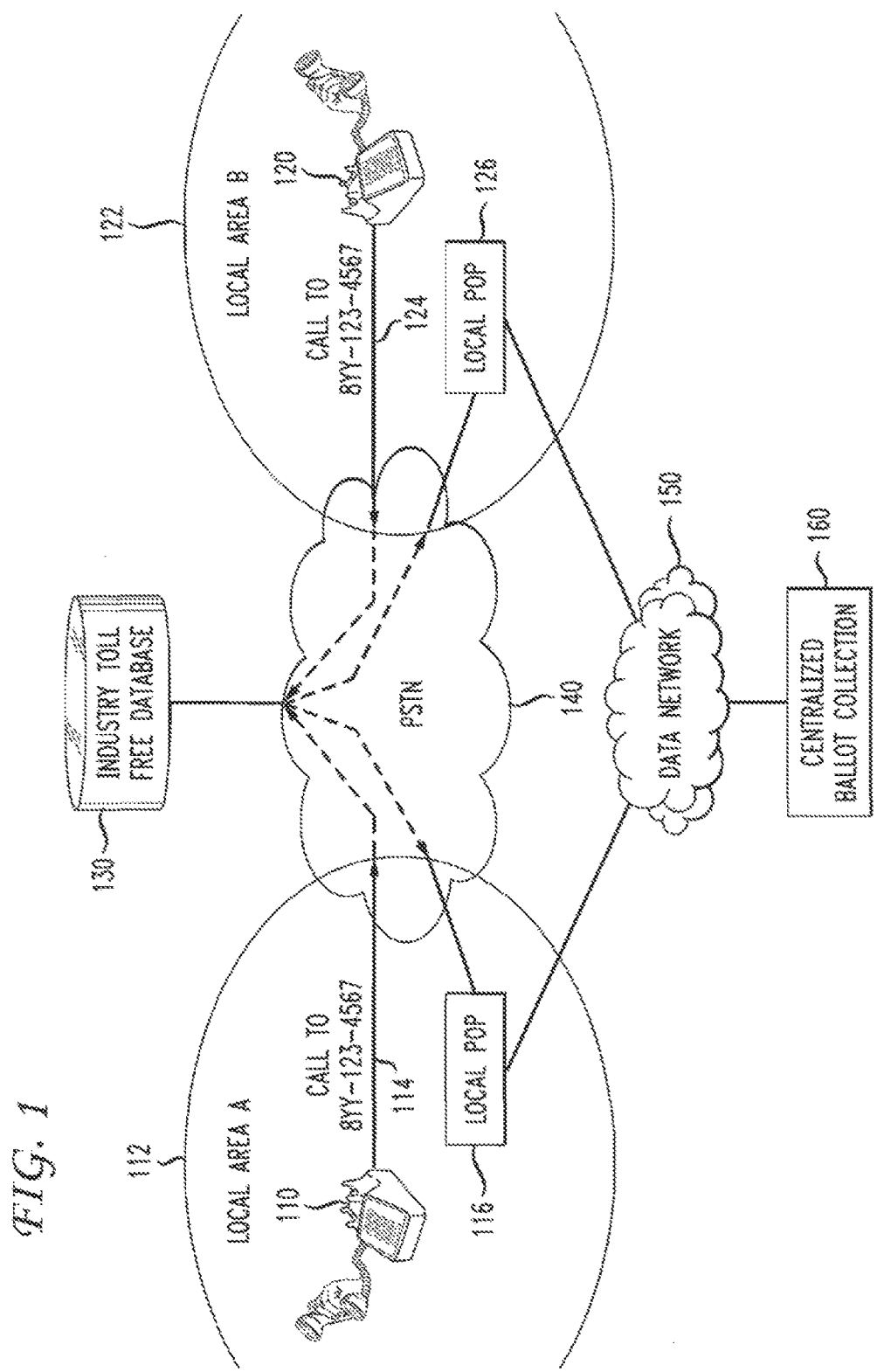
FIG. 1 is a schematic representation of portion of a communications network implementing one embodiment of the invention.

Stated generally, the system and method of the present invention routes ballot calls to a localized point-of-presence (POP) based on routing techniques used for services such as 911 routing. The ballot call is routed to a local destination even though the caller dials a number that is used nationally or in a large region. The routing makes use of the caller's ANI or other caller identification technology to determine the caller's geographic or network location, and determines the local POP nearest the caller to which to route the call. The caller casts a ballot by selecting which balloting number to call, or may be prompted by an interactive voice response (IVR) system. At periodic intervals, the local POPs forward accumulated tallies to a centralized location via the Internet or another data network. Instructions may periodically be downloaded from the centralized location to the POPs.

An exemplary embodiment of a system according to the present invention is shown in FIG. 1. In that example, two callers or voters 110, 120 are placing ballots. Caller 110 is in local area A (112) and caller 120 is in local area B (122). Each caller 110, 120 is connected to the Public Switched Telephone Network (PSTN) 140 by a residential line 114, 124.

The callers 110, 120 each use one or more toll-free 8YY numbers (such as a number with an 800 area code) for voting. In one embodiment of the invention, a single 8YY number per candidate is assigned. In that case, a call to a number indicates a vote for a candidate. In another embodiment, a single 8YY number is used for the entire election. In that embodiment, an IVR is used to prompt the caller to vote for the desired candidate by, for example, pressing designated keys on a touchtone phone.

In either case, the call itself is not routed through the long-distance provider network, as would normally be done to connect a toll-free number. Instead, when an 8YY ballot call is received at a local originating switch in the PSTN 140, the switch queries the AIN to determine how to route the call, as would be done for any call at the originating switch. The originating switch may even have the routing information already stored or cached locally. In the system and method of the invention, the AIN does not tabulate the votes; instead, the AIN directs the originating switch to route the call to one of numerous local "voting booths" or points of presence. The particular POP to which to route the call is chosen by looking up the calling telephone number (as determined using ANI) in a database mapping originating telephone numbers with POPs closest to the subscriber (either geographically or on the network). The database may be part of the industry toll-free database 130, or may be maintained locally in the originating switches. Based on that information, the originating switch routes the ballot call to the voting booth (i.e., another switch or POP) "closest" to the caller.

In certain instances, it may be inconvenient or even impossible to determine a local area from which a call originates. For example, a call originating from a voice-over-IP (VoIP) phone or a mobile phone may originate in a location geographically unrelated to the originating telephone number. In such a case, other parameters, such as an originating cell location in the case of a mobile call, or a user-input in the case of a VoIP call, may be used to determine an originating geographic location. Similar techniques are used in emergency 911 systems. Another approach is to simply ignore the geographic point of origin of the call, and to instead route the call to a voting booth based on some other criterion, or randomly. The distribution of the calls among a plurality of voting booths will still avoid focused overload.

In any case, in the example shown in FIG. 1, the balloting call from caller 110 is routed to local POP 116 in local area A (112), and the balloting call from caller 120 is routed to local POP 126 in local area B (122).

If a single 8YY number is assigned per election, the local POPs 116, 126 would include IVRs to prompt the caller to place a vote for an individual candidate. If each candidate is assigned a unique 8YY number in an election, an IVR might still be included in each POP to respond with a courtesy message indicating, for example, that a vote has been received for the corresponding candidate. In either case, the POPs 116, 126 tally the votes for each candidate as those votes are received.

From time to time, the local POPs 116, 126 forward voting tallies for each candidate to a centralized location 160. That forwarding process is carried out over a data network 150, and not through the PSTN 140. For example, the Internet might be used as the data network 150. The system and method of the present invention make use of a data network 150 to connect local POPs 116, 126 with the centralized location 160 to combine the tallies from each of the local POPs collecting the votes, as well as to provide instructions from the centralized location 160 to the POPs, as described below.

The votes may be forwarded by the POPs 116, 126 to the centralized ballot collection site 160 at predetermined time intervals, or as predetermined numbers of votes are accumulated. For example, the POPs may forward a tally of the votes every ten minutes, or as each 1,000 votes are accumulated. By having the POPs forward the votes according to a schedule, it is assured that the centralized location has a reasonably current account of voting activity for reporting on television or elsewhere. Alternatively, the centralized ballot collection site 160 may send queries to the POPs, requesting vote tallies from each site as the central location is available to receive them.

Any number of protocols may be used for sending the tallied voting information. For example, the voting booths may send a summary file containing the candidate IDs and the number of votes for each candidate. Alternatively, the central location may query the voting booth for the number of votes for a first candidate and receive the tally, then query for the second candidate and receive the tally (i.e., a request/response format). All transfer of voting information to the central location is made through a data network 150 such as the Internet.

The invention removes the focused overload on the AIN and the PSTN caused by a nationally-triggered voting event, such as a television broadcast. Instead, long distance communications providers compile tallies transmitted over the data network 150, and not calls over the PSTN.

The POP to which a balloting call is routed is not necessarily the closest geographically to the caller. Instead, that POP is a terminating switch/POP capable of tabulating votes based on called numbers (or providing IVR prompting) and accessible through the PSTN. That allows a load balancing so, for example, calls from the West Coast go to a "booth" in Houston, for example, calls from the Mid West go to a "booth" in Chicago, and calls from the East go to a "booth" in NY. Alternatively, the originating switch that first gets a balloting call could be a voting booth.

In the case where there are different phone numbers for each candidate, the terminating switch/POP need not answer the call; instead, it simply records how many calls it receives for a particular phone number.

The present invention reduces access charges that must be paid by the sponsoring IXC to the ILEC that initially handles the call. Typically, when an 8XX call comes into a local switch, the ILEC collects an access charge for completing the call to the long distance carrier. In the present invention, the destination is preferably a local number so no access charges are incurred. The call is instead sent from one local switch to another. Even though an 8YY number is dialed to vote, the local originating switch belonging to the ILEC is instructed to send the call to a local switch belonging to the long distance carrier.

As noted above, the data network 150 is also used for communications from the centralized site 160 to the local POPs 116, 126. Such communications would typically transfer, for example, voice files for announcements that use the File Transfer Protocol (FTP). Those voice files provide the announcements to be played out when voters call in to the local sites.

As voting progresses from round to round and candidates drop out, the centralized site 160 might update the announcements with new voice files, eliminating candidates no longer in the race. Alternatively, the centralized site might send instructions to the local sites 116, 126 to modify the existing files in some way (e.g., delete certain files). Protocols typically used for remote access might be used in this instance.

An exemplary method 200 of receiving a vote according to the invention, shown in block diagram form in FIG. 2, begins with providing (step 210) a network identifier for use in casting a ballot. For example, a network television show might broadcast a toll-free 800 number to call to place a vote for a candidate. A call to the network identifier is then received (step 220). The call includes a caller identifier.

Based on the caller identifier, the call is routed (step 230) to a network node that is local to the caller. The term "local," as used in the present disclosure, means geographically local or in an area of the network that is "local" to the caller.

Tallied ballots are periodically received (step 240) from the local network node. The ballots are transmitted from the network node through a data network such as the Internet. Also using the data network, instructions may be periodically forwarded (step 250) to the local network node.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to telephone equipment and ANI technology, the method and apparatus of the invention may be used with any network that would be available to voters. For example, when the service platform is accessed from an IP device, technology that identifies the IP address of the device may be used instead of the ANI technology. Alternatively, the network identifier may be a Uniform Resource Locator (URL) in a computer network. It is to be understood that the embodiments shown and described herein are only illustrative of the principles of the present invention and that various modifications may be implemented by those skilled in the art without departing from the scope and spirit of the invention.

What is claimed is:

1. A method, comprising:
   by a centralized ballot collection server, periodically receiving a tally of ballots through a communications network from a forwarding local point of presence of a plurality of local points of presence within the communications network, the tally being a count of voting calls received by the forwarding local point of presence via the communications network, each one of the voting calls being routed from a call originating switch to the forwarding local point of presence based on a selection of the forwarding local point of presence from the plurality of local points of presence by looking up a calling telephone number of the voting call in a database mapping telephone numbers with the plurality of local points of presence.

2. The method of claim 1, wherein periodically receiving the tally of ballots from the forwarding local point of presence comprises receiving the tally of ballots at predetermined time intervals.

3. The method of claim 1, wherein periodically receiving the tally of ballots from the forwarding local point of presence comprises receiving the tally of ballots when a predetermined number of votes is accumulated by the forwarding local point of presence.

4. The method of claim 1, further comprising:
before receiving the tally of ballots, sending a query requesting the tally of ballots.

5. The method of claim 1, wherein the tally of ballots is further a count of voting calls directed to a particular called number.

6. The method of claim 1 wherein the communications network comprises the Internet.

7. The method of claim 1 wherein the communications network comprises a public switched telephone network.

8. The method of claim 1, further comprising:
transmitting through the communications network to the plurality of local points of presence instructions for processing calls.

9. The method of claim 8 wherein the instructions include voice files for announcements to be played to callers.

10. A centralized ballot collection server comprising a processor and a tangible computer-usable medium having stored thereon computer readable instructions, wherein execution of the computer readable instructions by the processor causes the processor to perform operations comprising:
periodically receiving a tally of ballots through a communications network from a forwarding local point of presence of a plurality of local points of presence within the communications network, the tally being a count of voting calls received by the forwarding local point of presence via the communications network, each one of the voting calls being routed from a call originating switch to the forwarding local point of presence based on a selection of the forwarding local point of presence from the plurality of local points of presence by looking up a calling telephone number of the voting call in a database mapping telephone numbers with the plurality of local points of presence.

11. The centralized ballot collection server of claim 10, wherein periodically receiving the tally of ballots from the forwarding local point of presence comprises receiving the tally of ballots at predetermined time intervals.

12. The centralized ballot collection server of claim 10, wherein periodically receiving the tally of ballots from the forwarding local point of presence comprises receiving the tally of ballots when a predetermined number of votes is accumulated by the forwarding local point of presence.

13. The centralized ballot collection server of claim 10, wherein the operations further comprise:
before receiving the tally of ballots, sending a query requesting the tally of ballots.

14. The centralized ballot collection server of claim 10, wherein the tally of ballots is further a count of voting calls directed to a particular called number.

15. The centralized ballot collection server of claim 10 wherein the communications network comprises the Internet.

16. The centralized ballot collection server of claim 10 wherein the communications network comprises a public switched telephone network.

17. The centralized ballot collection server of claim 10, wherein the operations further comprise:
transmitting through the communications network to the plurality of local points of presence instructions for processing calls.

18. The centralized ballot collection server of claim 17 wherein the instructions include voice files for announcements to be played to callers.

* * * * *